United States Patent
Alford

(10) Patent No.: US 11,361,657 B1
(45) Date of Patent: Jun. 14, 2022

(54) APPLIANCE WITH USER POSITION DETERMINATION BASED ON MOBILE DEVICE

(71) Applicant: Haier US Appliance Solutions, Inc., Wilmington, DE (US)

(72) Inventor: Olivia Alford, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/111,702

(22) Filed: Dec. 4, 2020

(51) Int. Cl.
*G08C 17/02* (2006.01)
*H04B 17/27* (2015.01)

(52) U.S. Cl.
CPC ............. *G08C 17/02* (2013.01); *H04B 17/27* (2015.01); *G08C 2201/91* (2013.01); *G08C 2201/93* (2013.01)

(58) Field of Classification Search
CPC ................ G08C 17/02; G08C 2201/93; G08C 2201/91; H04B 17/27
See application file for complete search history.

(56) References Cited

U.S. PATENT DOCUMENTS

| | | | |
|---|---|---|---|
| 7,843,333 B2 | 11/2010 | Anelhag et al. | |
| 8,497,796 B2 | 7/2013 | Shamilian et al. | |
| 9,331,747 B2* | 5/2016 | Dodia | H04B 5/0031 |
| 9,331,862 B2* | 5/2016 | Lee | H04W 4/023 |
| 9,672,670 B2* | 6/2017 | Menkveld | H04L 67/10 |
| 9,716,530 B2* | 7/2017 | Imes | H04L 12/282 |
| 9,872,126 B2* | 1/2018 | Yarde | F24F 11/62 |
| 9,888,452 B2* | 2/2018 | Logan | G05B 19/0428 |
| 9,928,672 B2* | 3/2018 | Jablokov | G08C 17/02 |
| 10,129,383 B2* | 11/2018 | Imes | H04L 12/282 |
| 10,218,833 B2* | 2/2019 | Colston | G08C 17/02 |
| 10,241,530 B2* | 3/2019 | Ferguson | A47J 36/321 |
| 10,599,174 B2* | 3/2020 | Baker | H04W 4/021 |
| 10,616,713 B1* | 4/2020 | Yu | H04W 4/029 |
| 10,643,412 B1* | 5/2020 | Yang | H04N 7/183 |
| 10,978,064 B2* | 4/2021 | Rakshit | H04L 67/125 |
| 11,022,332 B2* | 6/2021 | Alexander | F24F 11/49 |
| 11,201,981 B1* | 12/2021 | Suiter | H04N 1/2125 |
| 2010/0188279 A1* | 7/2010 | Shamilian | H04L 67/34 341/176 |
| 2011/0028093 A1 | 2/2011 | Patel et al. | |
| 2013/0109404 A1* | 5/2013 | Husney | H04W 4/029 455/456.1 |
| 2014/0128001 A1 | 5/2014 | Imes et al. | |
| 2015/0127712 A1* | 5/2015 | Fadell | G08B 25/008 709/202 |
| 2015/0154850 A1* | 6/2015 | Fadell | G08B 29/185 340/501 |

(Continued)

FOREIGN PATENT DOCUMENTS

| | | |
|---|---|---|
| CN | 203084911 U | 7/2013 |
| CN | 104914834 A | 9/2015 |
| KR | 2014/0140370 A | 12/2014 |

*Primary Examiner* — Brian E Miller
(74) *Attorney, Agent, or Firm* — Dority & Manning, P.A.

(57) ABSTRACT

Position of a mobile device of a user relative to an appliance is determined. If the position meets a predetermined position parameter, one or more user-preferred actions are undertaken for the appliance. User-preferred actions can include activation or deactivation of one or more components of the appliance.

20 Claims, 8 Drawing Sheets

(56) References Cited

U.S. PATENT DOCUMENTS

| | | | |
|---|---|---|---|
| 2016/0142407 A1* | 5/2016 | Chun | H04L 63/0861 |
| | | | 726/5 |
| 2016/0179068 A1 | 6/2016 | Qian et al. | |
| 2016/0226732 A1* | 8/2016 | Kim | H04W 12/0431 |
| 2017/0289336 A1* | 10/2017 | Colston | H04M 1/72415 |
| 2018/0164655 A1* | 6/2018 | Cremer | G02F 1/25 |
| 2019/0056107 A1* | 2/2019 | Desai | F23N 1/002 |
| 2019/0113899 A1* | 4/2019 | Jeong | G16Y 40/35 |
| 2019/0289116 A1* | 9/2019 | Colston | H04W 4/80 |
| 2019/0289648 A1* | 9/2019 | Kim | H04W 76/11 |
| 2019/0341042 A1* | 11/2019 | Kim | H04L 67/125 |
| 2020/0175976 A1* | 6/2020 | Rakshit | H04L 67/125 |
| 2020/0186378 A1* | 6/2020 | Six | G06F 3/04817 |
| 2020/0199858 A1* | 6/2020 | Eilmus | E03C 1/182 |
| 2020/0347643 A1* | 11/2020 | Burke | E05B 47/02 |
| 2021/0239823 A1* | 8/2021 | VanBlon | H04W 4/80 |

* cited by examiner

APPLIANCE WITH USER POSITION DETERMINATION BASED ON MOBILE DEVICE

FIELD OF THE INVENTION

The subject matter of the present disclosure relates generally to determination of the position of a user relative to one or more appliances and, more particularly, to activity of one or more appliances based on the position of the user.

BACKGROUND OF THE INVENTION

Appliances are utilized generally for a variety of tasks by a variety of users in both commercial and residential settings. For example, a single residential location may include such appliances as laundry appliances (e.g., a washer and/or dryer) and kitchen appliances (e.g., a refrigerator, a microwave, and/or a coffee maker) along with room air conditioners and other various appliances. A commercial location may include a variety of similar appliances as well.

Typically, various functions of these appliances are manually activated by the user. For example, the user may interact with an interface panel to determine certain settings of the appliances, to select available cycles of the appliance, to start and stop the appliance, and select other features as well. The appliance may also perform certain functions or actions based on other interactions with the user. For example, upon the user's opening of a door of the appliance, it may automatically stop one or more operations, activate a light, and/or perform multiple other functions.

In the $21^{st}$ century, many users possess a mobile device with which the user is in constant contact—either carrying the device in their hand or clothing throughout the day. Such mobile device is likely to be a mobile phone or smart phone but may also include tablets, personal digital assistants, and other handheld devices. These mobile devices frequently include the ability to connect wirelessly to the Internet and/or other devices and may be programmed or loaded with a variety of different applications (e.g., software) as desired by the user.

Certain appliances may also include features for connecting wirelessly to the Internet and/or other appliances and devices. Some mobile devices may include applications intended for connection with an appliance so that e.g., the appliance may be operated remotely. Various controls provided on the interface panel and other features of the appliance may be operable using the mobile device.

An appliance that can perform certain features based on the position of a user relative to the appliance would be beneficial. More particularly, an appliance that can automatically determine the position of a user and perform one or more desirable operations depending upon the user's position would be particularly useful. Such an appliance that can perform functions that might otherwise require manual activation by the user would be also be desirable.

BRIEF DESCRIPTION OF THE INVENTION

Additional aspects and advantages of the invention will be set forth in part in the following description, or may be apparent from the description, or may be learned through practice of the invention.

In one exemplary aspect, the present invention provides a method of appliance operation. The method includes detecting a presence of a mobile device of a user; determining a position of the mobile device relative to a first appliance; ascertaining whether the position of the mobile device relative to the first appliance meets a predetermined position parameter and, if so, then causing the first appliance to execute at least one user-preferred-action based on the position of the mobile device of the user.

In another exemplary embodiment, the present invention provides an appliance that includes a cabinet and a controller located in the cabinet. The controller is configured for detecting a presence of a mobile device of a user; determining a position of the mobile device relative to the appliance; ascertaining whether the position of the mobile device relative to the appliance meets a predetermined position parameter and, if so, then causing the appliance to execute at least one user-preferred-action based on the position of the mobile device of the user.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
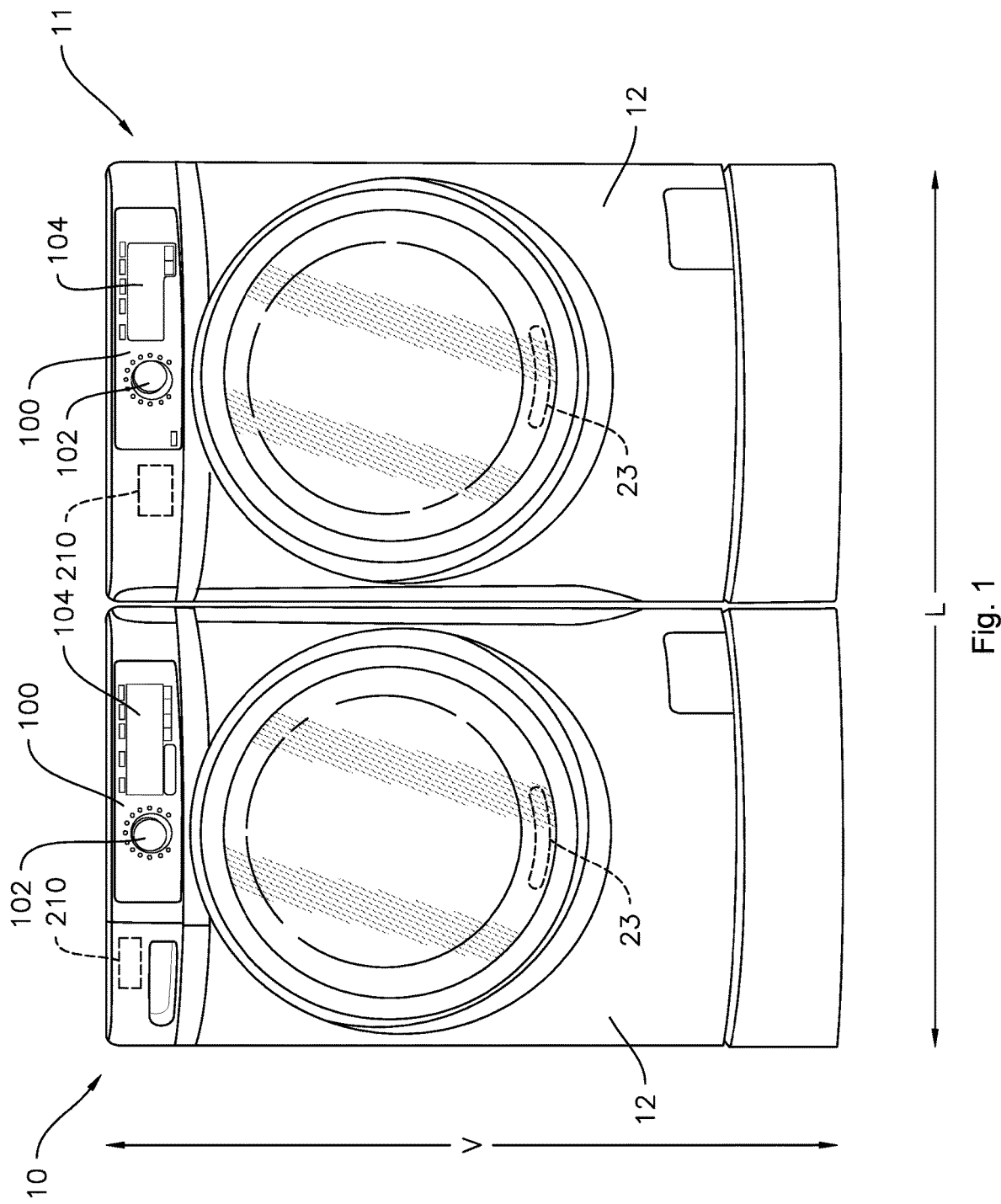
FIG. 1 provides a front view of exemplary laundry appliances in accordance with one or more embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As may be seen in FIGS. 1 through 6, in accordance with one or more embodiments of the present subject matter, an appliance 10 having a cabinet 12 is provided. The cabinet 12 defines a vertical direction V, a lateral direction L and a transverse direction T that are mutually perpendicular. The cabinet 12 extends between a top portion 13 and a bottom portion 14 along the vertical direction V. Cabinet 12 also extends between a first side portion 15 and a second side portion 16, e.g., along the lateral direction L, and a front portion 17 and a back portion 18, e.g., along the transverse direction T.

A user interface panel 100 and a user input device 102 may be positioned on an exterior of the cabinet 12. The user input device 102 is generally positioned proximate to the user interface panel 100, and in some embodiments, the user input device 102 may be positioned on the user interface panel 100. The appliance 10 may also include features for detecting the presence of a user, as will be described in more detail below.

In various embodiments, the user interface panel 100 may represent a general purpose I/O ("GPIO") device or functional block. In some embodiments, the user interface panel 100 may include or be in operative communication with user input device 102, such as one or more of a variety of digital, analog, electrical, mechanical or electro-mechanical input devices including rotary dials, control knobs, push buttons, and touch pads. The user interface panel 100 may include a display component 104, such as a digital or analog display device designed to provide operational feedback to a user. The display component 104 may also be a touchscreen capable of receiving a user input, such that the display component 104 may also be a user input device in addition to or instead of the user input device 102.

Generally, the appliance 10 may include a controller 210 in operative communication with the user input device 102. The user interface panel 100 and the user input device 102 may be in communication with the controller 210 via, for example, one or more signal lines or shared communication busses. Input/output ("I/O") signals may be routed between controller 210 and various operational components of the appliance 10. Operation of the appliance 10 can be regulated by the controller 210 that is operatively coupled to the user interface panel 100. A user interface panel 100 may for example provide selections for user manipulation of the operation of an appliance, e.g., via user input device 102 and/or display 104. In response to user manipulation of the user interface panel 100 and/or user input device 102, the controller 210 may operate various components of the appliance 10.

Controller 210 may include a memory and one or more microprocessors, CPUs or the like, such as general or special purpose microprocessors operable to execute programming instructions or micro-control code associated with operation of the appliance 10. The memory may represent random access memory such as DRAM, or read only memory such as ROM or FLASH. In one embodiment, the processor executes programming instructions stored in memory. The memory may be a separate component from the processor or may be included onboard within the processor. Alternatively, a controller 210 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

The controller 210 may be programmed to operate the appliance 10 by executing instructions stored in memory. For example, the instructions may be software or any set of instructions that when executed by the processing device, cause the processing device to perform operations. Controller 210 can include one or more processor(s) and associated memory device(s) configured to perform a variety of computer-implemented functions and/or instructions (e.g. performing the methods, steps, calculations and the like and storing relevant data as disclosed herein). It should be noted that controllers 210 as disclosed herein are capable of and may be operable to perform any methods and associated method steps as disclosed herein. The use of the term "step" does not necessarily require a singular action and may include multiple acts or steps.

In some embodiments, for example, as illustrated in FIG. 1, the appliance 10 may be one of a set of two or more appliances. In the exemplary embodiment illustrated in FIG. 1, appliance 10 may be one of a pair of laundry appliances, e.g., the appliance may be a washer 10 and/or dryer 11. In embodiments such as illustrated in FIG. 1, the user input device 102 of each appliance 10 and 11 may be positioned on the user interface panel 100. The embodiment illustrated in FIG. 1 also includes a display 104 on the user interface panel.

Figure 2:
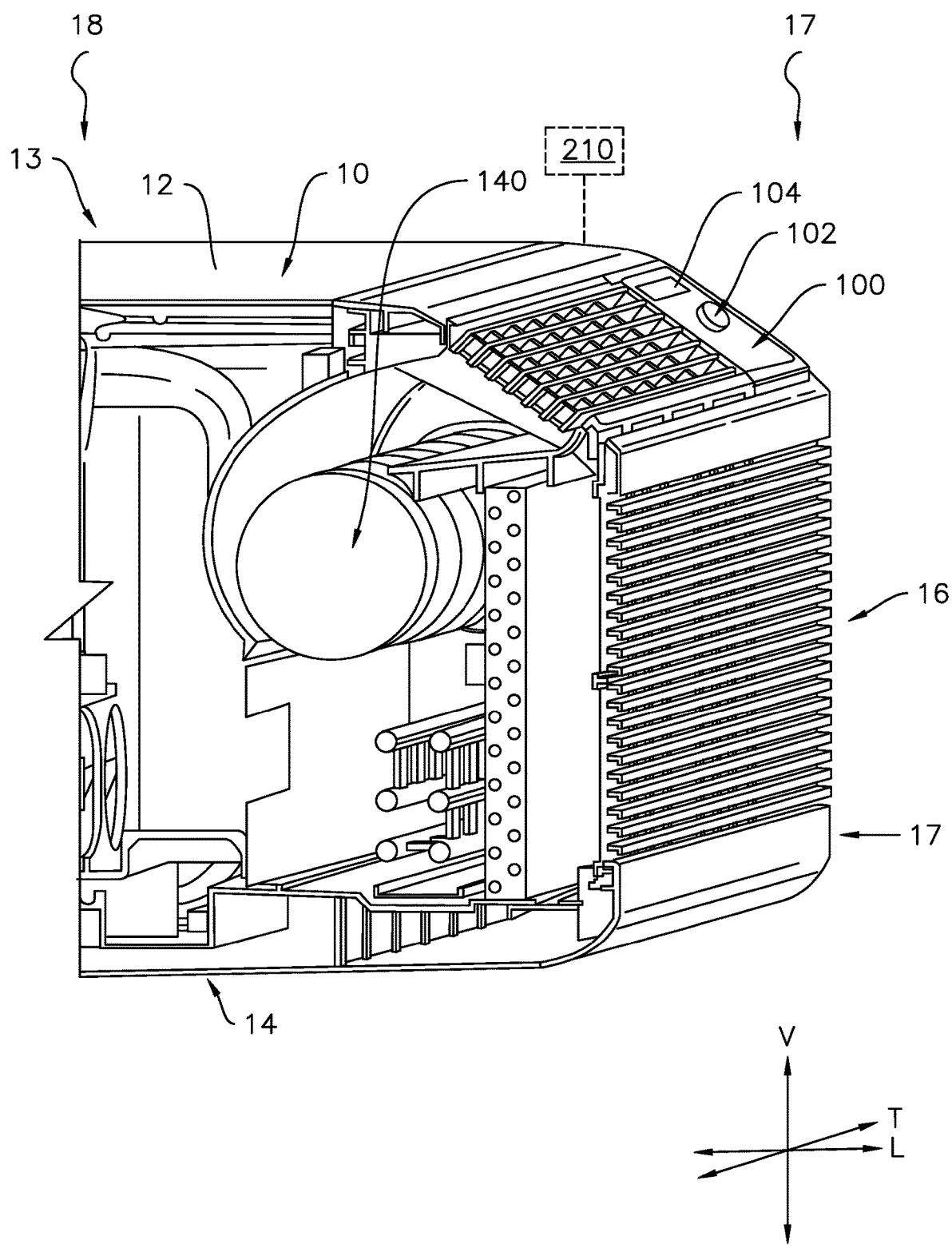
FIG. 2 provides a partial perspective view of an exemplary air conditioner appliance in accordance with additional embodiments of the present disclosure.
Figure 3:
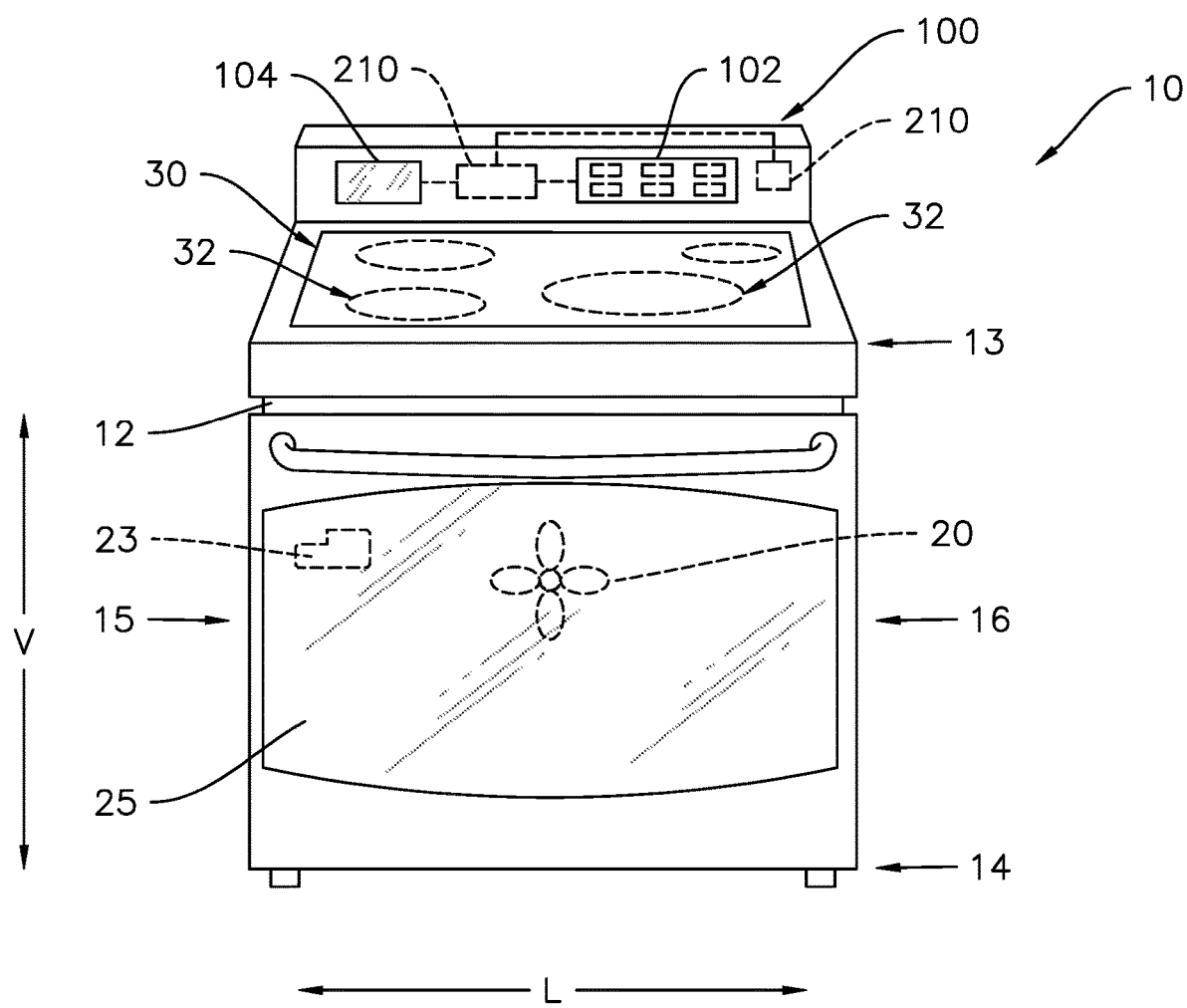
FIG. 3 provides a perspective view of an oven appliance in accordance with additional embodiments of the present disclosure.

FIG. 2 illustrates another example embodiment of the appliance 10, wherein the appliance 10 is a room air conditioner. As illustrated, the exemplary air conditioner 10 includes cabinet 12, user interface panel 100 and user input device 102. In the illustrated example of FIG. 2, the user input device 102 is a control knob, similar to those illustrated in FIGS. 1 and 6. The air conditioner 10 may also include a controller 210, and the controller 210 may be configured to activate the air conditioner 10, e.g., by turning on fan 140 to circulate air. Other functions may be configured as well, FIG. 3 illustrates another example embodiment of the appliance 10, wherein the appliance 10 is an oven appliance including a cooktop and an oven, which may include a fan 20 and other features for convection cooking. The exemplary oven appliance 10 illustrated in FIG. 3 includes user interface panel 100 and user input device 102. In the illustrated example of FIG. 3, the user input device 102 is a touch screen interface. Oven appliance 10 is provided by way of example only and is not intended to limit the present subject matter in any aspect. Thus, the present subject matter may be used with other oven appliance configurations, e.g., that define one or more interior cavities for the receipt of food and/or having different heating element arrangements than what is shown in FIG. 3. Further, the present subject matter may be used in a stand-alone cooktop, a hot plate, or any other suitable appliance.

As illustrated in FIG. 3, the exemplary oven appliance 10 generally includes a cooking assembly. The cooking assembly may include one or more heating elements. For example, in some embodiments, the cooking assembly includes cabinet 12 which in some embodiments may be an insulated cabinet 12 with an interior cooking chamber (not shown) configured for the receipt of one or more food items to be cooked defined within insulated cabinet 12. Such cooking chambers are generally understood by those of ordinary skill in the art and are not described in further detail herein. The oven appliance 10 may additionally include a cooktop 30. Cooktop 30 may be disposed on the cabinet 12 generally at or proximate to top portion 13. Cooktop 30 includes one or more heating assemblies 32, e.g., electric heating elements or gas burners, thereon.

Figure 4:
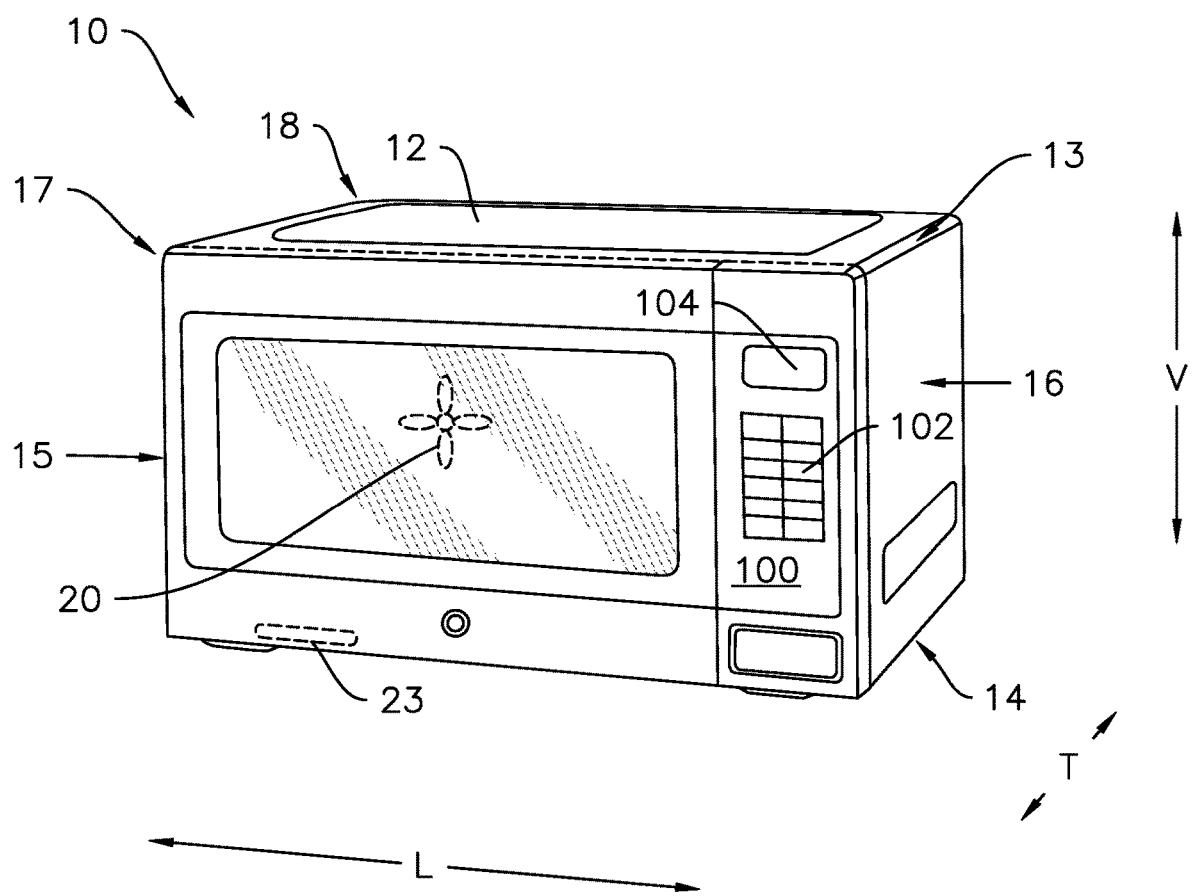
FIG. 4 provides a perspective view of a microwave oven appliance in accordance with additional embodiments of the present disclosure.

In another example embodiment, the appliance 10 may be a microwave oven appliance, such as is illustrated in FIG. 4. It should be understood that microwave oven appliance 10 is provided by way of example only. Thus, the present subject matter is not limited to microwave oven appliance 10 and may be utilized in any suitable appliance.

Microwave oven appliance 10 includes a cabinet 12. A cooking chamber is defined within the cabinet 12 of the microwave 10. Microwave 10 of FIG. 4 is configured to heat articles, e.g., food or beverages, within the cooking chamber using electromagnetic radiation. Microwave appliance 10 may include various components which operate to produce the electromagnetic radiation, as is generally understood. For example, microwave appliance 10 may include a magnetron (such as, for example, a cavity magnetron), a high voltage transformer, a high voltage capacitor and a high voltage diode. The transformer may provide energy from a suitable energy source (such as an electrical outlet) to the magnetron. The magnetron may convert the energy to electromagnetic radiation, specifically microwave radiation. The capacitor generally connects the magnetron and transformer, such as via high voltage diode, to a chassis. Microwave radiation produced by the magnetron may be transmitted through a waveguide to the cooking chamber. The structure and intended function of microwave ovens are generally understood by those of ordinary skill in the art and are not described in further detail herein.

Figure 5:
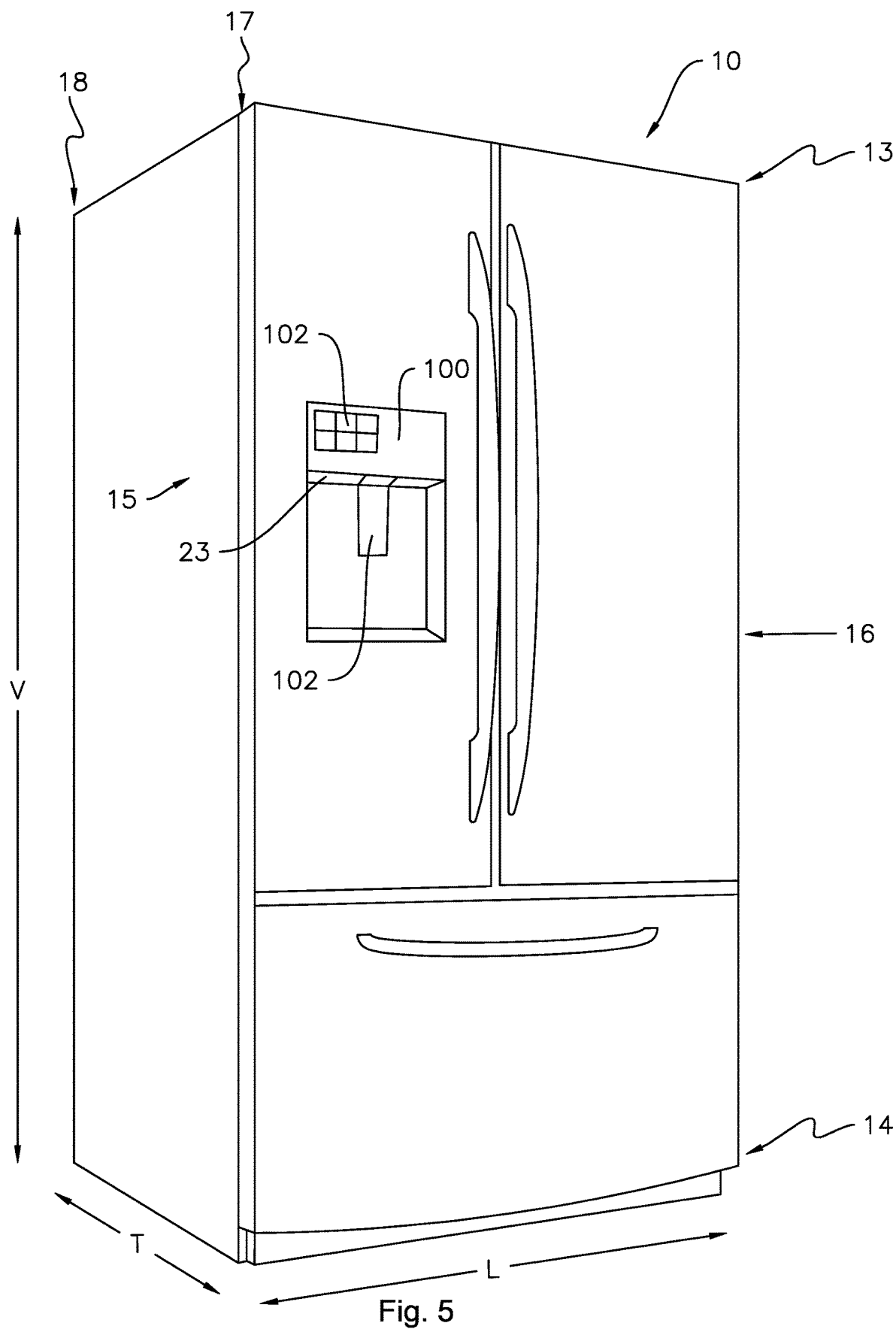
FIG. 5 provides a perspective view of a refrigeration appliance in accordance with additional embodiments of the present disclosure.

In another embodiment, the appliance 10 may be a refrigerator appliance, such as is illustrated in FIG. 5. FIG. 5 provides a perspective view of a refrigerator appliance 10 according to an exemplary embodiment of the present subject matter. Refrigerator appliance 10 includes a cabinet 12. The example refrigerator appliance 10 depicted in FIG. 5 is generally referred to as a bottom mount refrigerator appliance. However, it should be understood that refrigerator appliance 10 is provided by way of example only. Thus, the present subject matter is not limited to refrigerator appliance 10 and may be utilized in any suitable appliance, including without limitation, side-by-side style refrigerator appliances or top mount refrigerator appliances as well.

Refrigerator appliance 10 may also include a dispensing assembly for dispensing, e.g., liquid water and/or ice to, for example, a dispenser recess defined on the exterior of cabinet 12, as is generally understood in the art. Thus, in some embodiments, the appliance 10 may be a refrigerator appliance and the user interface panel 100 may be or include a control panel of the dispensing assembly. Further with reference to the exemplary embodiment illustrated in FIG. 5, in some exemplary embodiments including refrigerator appliance 10 and a dispensing assembly, the user input device 102 may be a paddle of the dispensing assembly, the paddle 102 in FIG. 5 being an exemplary embodiment of the user input device. Such dispensing assemblies, including actuators therefor such as paddles, levers, etc., are generally understood in the art and are not described further herein.

Figure 6:
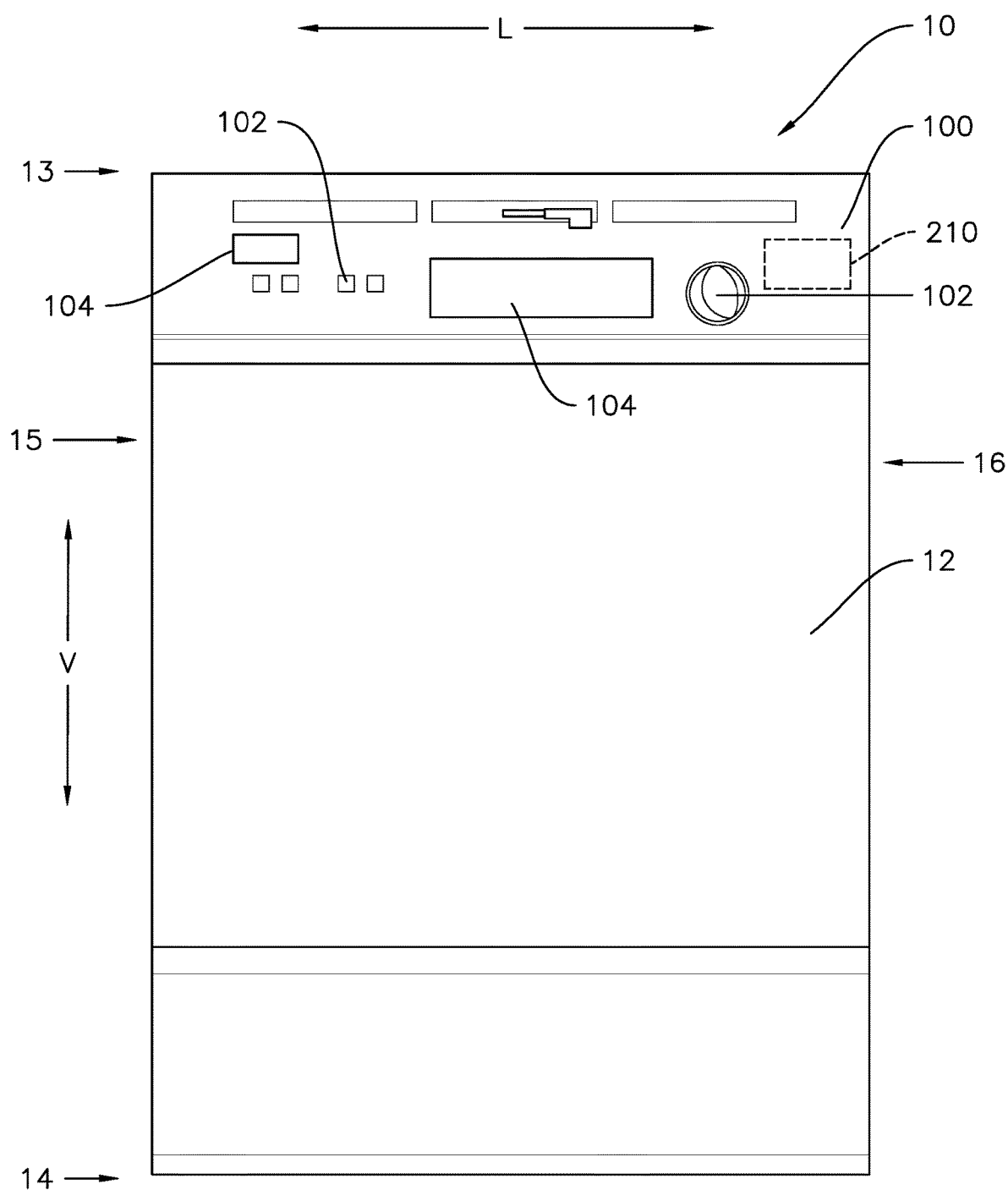
FIG. 6 provides a front view of a dishwashing appliance in accordance with additional embodiments of the present disclosure.

FIG. 6 provides a front view of a dishwashing appliance 10 according to yet another exemplary embodiment of the present subject matter. The dishwashing appliance includes a cabinet 12 with a user interface panel 100 thereon. In the illustrated example embodiment of the FIG. 6, the user interface panel includes multiple user input devices 102, e.g., a knob and a plurality of buttons, as well as a display 104. In various embodiments, any suitable combination of any one or more of the illustrated user input devices 102 and display 104 may be provided.

According to various embodiments of the present disclosure, the appliance 10 as will be referred to in the description that follows may take the form of any of the examples described above, or may be any other household appliance. Thus, it will be understood that the present subject matter is not limited to any particular household appliance.

Figure 7:
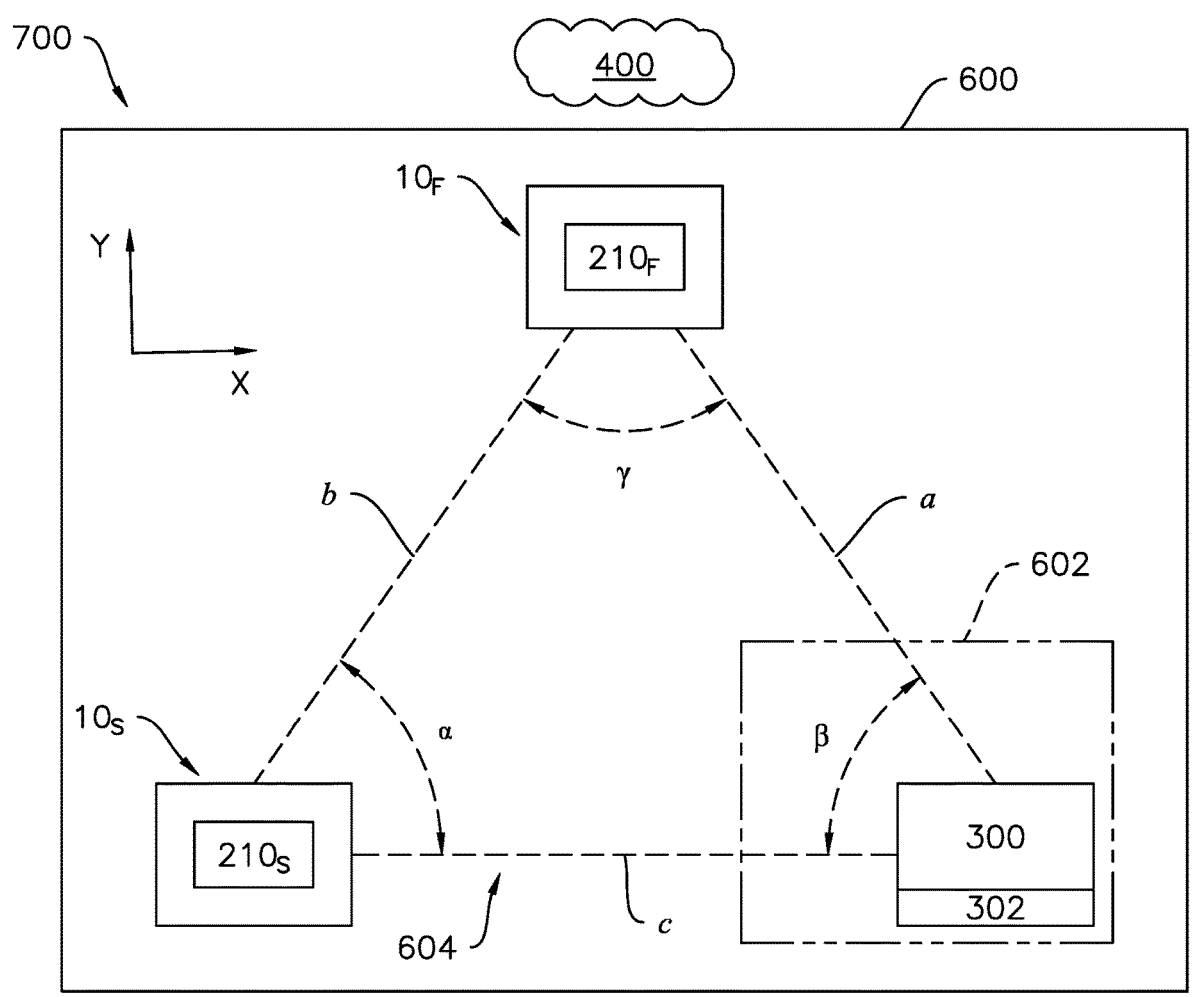
FIG. 7 provides an exemplary schematic diagram of appliances and a mobile device in communication.
Figure 8:
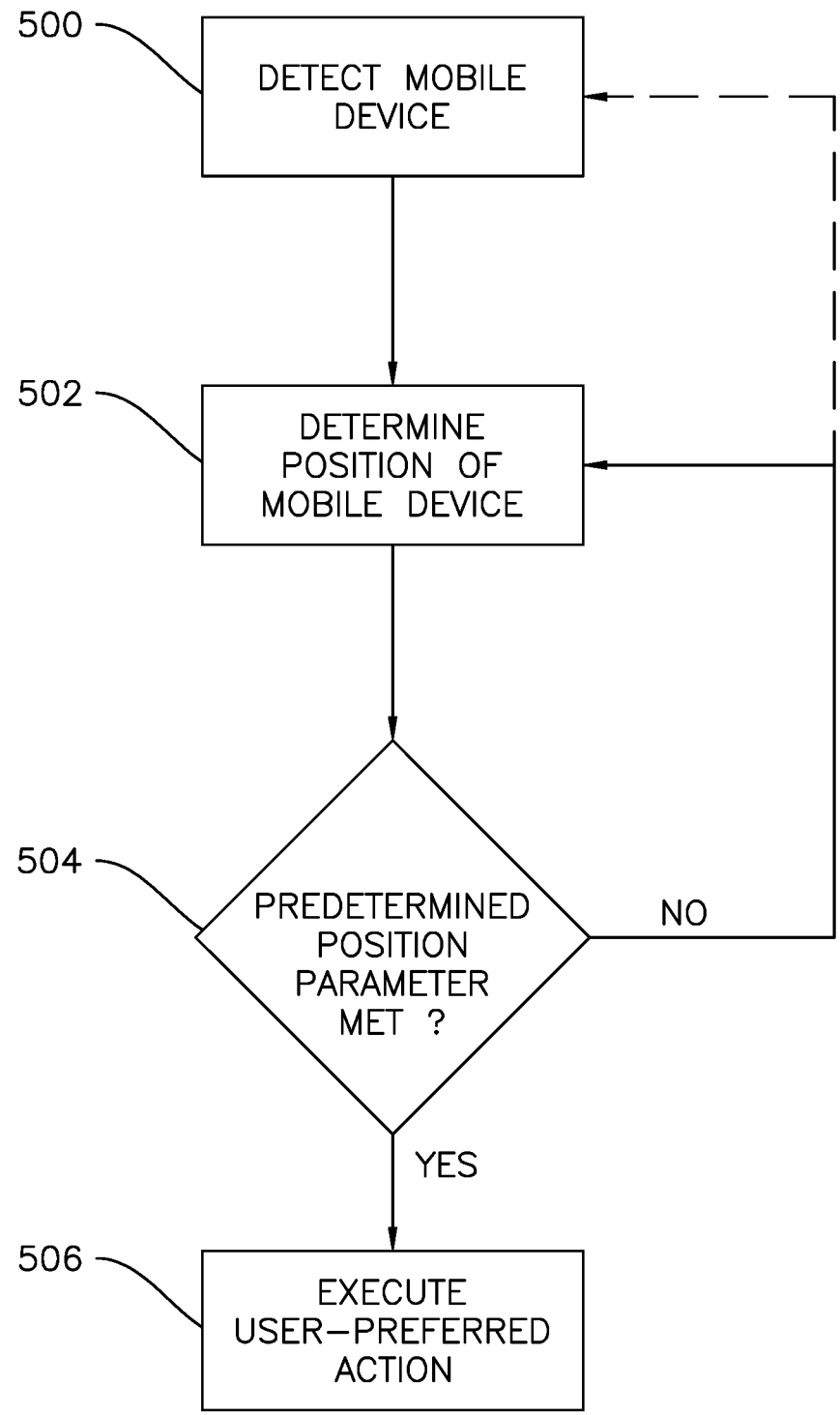
FIG. 8 provides an exemplary flow diagram illustrating an exemplary method of the present invention.

In one exemplary aspect, the present invention allows the determination of the position of a mobile device worn or carried by a user relative to an appliance. If that position meets a certain predetermined position parameter (PPP), one or more useful actions can be undertaken by the appliance. Referring now to FIGS. 7 and 8, an exemplary aspect of the invention will be explained with reference to appliance 10, which may be referred to as a first appliance $10_F$ so as to distinguish it from a second appliance $10_S$ in the description that follows, it being understood that for such appliances the previous description and FIGS. 1 through 6 provide representative examples in appliance 10.

The present invention will also be explained with reference to an exemplary mobile device 300. In certain embodiments, mobile device 300 may include a mobile interface device 302 such as a keyboard, touch sensitive screen, or other device for manipulating mobile device 300. In certain embodiments, mobile device may be a may be a computer, personal digital assistant, smartphone, tablet, personal computer, wearable device, mobile component of a smart home system, or other and/or various other suitable devices carried or worn by the user. Mobile device 300 may include a memory for storing and retrieving programming instructions. Thus, mobile device 300 may provide mobile user interface 302 as an additional user interface to the user interface panel 100. For example, mobile device 300 may be a smartphone operable to store and run applications, also known as "apps." Other examples of a mobile device may be used with the present invention as well.

Appliance $10_F$ may also be configured to communicate with mobile device 300. Appliance $10_F$ may be in communication with mobile device 300 through various possible communication connections and interfaces. For example, appliance $10_F$ and mobile device 300 may be matched in wireless communication, e.g., connected to the same wireless network. Appliance $10_F$ may communicate with mobile device 300 via short-range radio such as BLUETOOTH® or any other suitable wireless network having a layer protocol architecture. As used herein, "short-range" may include ranges less than about ten meters and up to about one hundred meters. For example, the wireless network may be adapted for short-wavelength ultra-high frequency (UHF) communications in a band between 2.4 GHz and 2.485 GHz (e.g., according to the IEEE 802.15.1 standard). In particular, BLUETOOTH® Low Energy, e.g., BLUETOOTH® Version 4.0 or higher, may advantageously provide short-range wireless communication between the appliance $10_F$ and mobile device 300. For example, BLUETOOTH® Low Energy may advantageously minimize the power consumed by the exemplary methods and devices described herein due to the low power networking protocol of BLUETOOTH® Low Energy. As another example, BLUETOOTH® Low Energy may advantageously provide improved accuracy in determining a distance a between mobile device 300 and the appliance 10.

Appliance $10_F$ may also be configured to communicate wirelessly with a cloud-server 400 that may include a database or may be, e.g., a cloud-based data storage system. For example, appliance $10_F$ may communicate with cloud-server 400 over the Internet, which appliance $10_F$ may access via WI-FI®, such as from a WI-FI® access point in a user's home. Mobile device 300 may also communicate with cloud-server 400. Similarly, appliance $10_F$ and appliance $20_F$ may also communicate wirelessly with each other, and appliance $20_F$ may communicate with mobile device 300, cloud-server 400, or both in the way as previously described for appliance $10_F$. The connection of two or more of the appliances 10, mobile device 300, and cloud server 400 may be referred to herein as a position determining network (PDN) 700.

Continuing with FIGS. 7 and 8, in a first step 500 of an exemplary aspect of the present invention, appliance $10_F$, and in particular, controller $210_F$ thereof, is configured to detect the presence of mobile device 300. In some embodiments, appliance $10_F$, appliance $10_S$, and/or mobile device 300 may scan for wireless signals associated with teach other. For example, mobile device 300 may scan for BLUETOOTH® signals including the UUID (universally unique identifier) associated with the appliance $10_F$ and appliance $10_S$, and vice versa.

Even after mobile device 300 is detected, before proceeding to step 502, appliance $10_F$ may be configured to wait until mobile device 300 is at or within a predetermined the distance a (FIG. 7). For example, the predetermined distance between the appliance $10_F$ and mobile device 300 might be e.g., equal to or less than a predetermined distance threshold ($a_{THR}$) of 20 feet, 10 feet, or less. Other values may be used. For example, the proximity of mobile device 300 may be detected but, before proceeding to step 502, appliance $10_F$ waits until mobile device 300 is within predetermined distance threshold $a_{THR}$. Such might be determined e.g., from a received signal strength indicator of a short-range radio signal, e.g., a BLUETOOTH® signal including the UUID 1020, received from mobile device 300.

In another exemplary aspect, appliance $10_F$ may confirm that mobile device 300 is associated with a particular user before proceeding to step 502. For example, appliance $10_F$ may send a signal to cloud-server 400 that may include data encoded therein including a UUID of appliance $10_F$ and confirm a unique user credential (UUC) for mobile device 300 or such may be confirmed without such signal by controller $210_F$.

Also, once the credentials of mobile device 300 are confirmed, cloud-server 400 may communicate one or more user-preferred actions to appliance $10_F$ mobile device 300, or both, based on the identity of mobile device 300. Alternatively, such user-preferred actions may be already stored by controller $210_F$. For example, the user of mobile device 300 may use an app to select one or more user-preferred actions (UPAs) for appliance $10_F$ and other appliances at a particular location such as appliance $10_S$. This might be accomplished, for example, when first appliance $10_F$ is originally installed or updated at a later time during use of the appliance. The user might, for example, select user-preferred actions (UPAs) that are specific to both the particular appliance $10_S$ identified by the UUID and the specific user associated with mobile device 300.

In some embodiments, systems and methods according to the present subject matter may accommodate multiple users and provide custom settings for each of the multiple user associated with different mobile devices. As a simplified example for purposes of illustration, the multiple users may include a first user and a second user. It is to be understood, however, that the present disclosure is not limited to two users, any number of users may be accommodated with specific custom settings or predetermined customized operating parameters. In some embodiments, the user credential UUC may be a first user credential associated with a first user and a first set of first user-preferred actions and another UUC may be a second user credential associated with a second user and a second set of second user-preferred actions.

Continuing with FIGS. 7 and 8, in a second step, the position of mobile device 300 relative to appliance $10_F$ is determined. As used herein, "position" means the actual location of mobile device 300 relative to at least appliance $10_F$ and not just the distance a between mobile device 300 and appliance $10_F$. For example, the actual x-y location of mobile device 300 relative to appliance $10_F$ within a building or room 600 might be determined. Alternatively, whether mobile device 300 is within a zone or predetermined region 602 of such room 600 may be determined based on the position of mobile device 300. For example, room 600 may be kitchen and zone 602 may be a certain area within kitchen 600 that may be in front of, or include, appliance $10_F$. Other configurations may also be used.

As will be understood by one or ordinary skill in the art using the teachings disclosed herein, a variety of techniques may be used for determining the position of mobile device 300 relative to appliance $10_F$ including various triangulation techniques. One such technique will be described herein, but other techniques may be used that fall within the scope of the present invention including the claims that follow.

In one exemplary triangulation technique, the position of mobile device 300 is determined using first appliance $10_F$ (with controller $210_F$), second appliance $10_S$ (with controller $210_S$), and mobile device 300. More particularly, a first distance a between first appliance $10_F$ and mobile device 300 is determined e.g., as previously described based on one or more wireless signals between the same—which may also include communication with cloud-server 400. Similarly a second distance b between second appliance $10_S$ and mobile device 300 is determined e.g., as previously described based on one or more wireless signals between the same—which may also include communication with cloud-server 400. Finally, a third distance c between first appliance $10_F$ and second appliance $10_S$ is determined e.g., as previously described based on one or more wireless signals between the same—which may also include communication with cloud-server 400.

As will be readily understood by one of ordinary skill in the art, knowing distances a, b, and c, the actual position of mobile device 300 relative to both first appliance $10_F$ and second appliance $10_S$ can be determined. As shown in FIG. 7, mobile device 300, first appliance $10_F$, and second appliance $10_S$ form a triangle 604 having 1) sides a, b, and c; 2) angles $\alpha$, $\beta$ and $\gamma$ between the sides, and 3) a perimeter p, which is the sum of sides a, b, and c. For example, Briggs law provides a well-known relationship between these values as set forth in the equations below:

$$\sin\frac{\alpha}{2} = \sqrt{\frac{(p-b)(p-c)}{bc}} \qquad \cos\frac{\alpha}{2} = \sqrt{\frac{p(p-a)}{bc}} \qquad \tan\frac{\alpha}{2} = \sqrt{\frac{(p-b)(p-c)}{p(p-a)}}$$

$$\sin\frac{\beta}{2} = \sqrt{\frac{(p-c)(p-a)}{ac}} \qquad \cos\frac{\beta}{2} = \sqrt{\frac{p(p-b)}{ac}} \qquad \tan\frac{\beta}{2} = \sqrt{\frac{(p-c)(p-a)}{p(p-b)}}$$

$$\sin\frac{\gamma}{2} = \sqrt{\frac{(p-a)(p-b)}{ab}} \qquad \cos\frac{\gamma}{2} = \sqrt{\frac{p(p-c)}{ab}} \qquad \tan\frac{\gamma}{2} = \sqrt{\frac{(p-a)(p-b)}{p(p-c)}}$$

In still another example, if a third appliance $10_T$ is available to detect mobile device 300 and determine the distance between third appliance $10_T$ and mobile device 300, other triangulation techniques may also be applied to determine the position of mobile device 300 as will be understood by one or ordinary skill in the art using the teachings disclosed herein. The determination of the position of mobile device 300 (e.g., processing of the above information and execution of a triangulation technique) may be undertaken by mobile device 300, first appliance $10_F$, second appliance $10_S$, cloud server 400, or combinations thereof.

In step 504, whether the determined position of mobile device 300 relative to first appliance $10_F$ meets a predetermined position parameter (PPP) is ascertained. The predetermined position parameter (PPP) may e.g., be a parameter provided by the user, may be provided by one or manufactures of the appliances, may be provided from cloud-based server 400, and/or may include combinations thereof. By way of example, the predetermined position parameter (PPP) may be zone 602 so that in step 504, a determination is made regarding whether mobile device 300 is within zone 602. Alternatively, the predetermined position parameter (PPP) may be whether mobile device 300 is within room or structure 600. In still another alternative, the predetermined position parameter (PPP) may be whether the position of mobile device 300 is within a certain distance in front of first appliance $10_F$. Still other predetermined position parameters may be used (including combinations thereof) as will be understood by one or ordinary skill in the art using the teachings disclosed herein.

As depicted in FIG. 8, if the predetermined position parameter PPP is not met, then first appliance $10_F$ (independently or in conjunction with other components of system 700 as previously described) returns to either detecting for the presence of mobile device 300 and/or determining the position of mobile device 300. If the predetermined position parameter (PPP) is met, then in step 506 the first appliance $10_F$ is caused to undertake one or more user-preferred-actions (UPAs) based on the determined position of mobile device 300 of the user. The user-preferred-actions or UPAs may e.g., be actions predetermined by the user, the manufacturer, or combinations thereof. For example, the user may utilize an app on mobile device 300 to select among one or more user-preferred-actions or UPAs during the installation and set-up of first appliance $10_F$.

Various examples of user-preferred-actions or UPAs will now be described used appliance 10 described with regard to FIGS. 1 through 6. Other user-preferred-actions or UPAs may be used (including combinations thereof) as will be understood by one or ordinary skill in the art using the teachings disclosed herein By way of example, in embodiments wherein the appliance 10 includes a display 104, controller 210 may be configured to execute a UPA that includes activating the appliance 10 by turning on or waking the display 104, which may also include providing a customized greeting or other message to the specific user on the display 104. In still other embodiments, controller 210 may be configured to execute a UPA whereby display 104 provides certain prompts or predetermined messages to the user. In some embodiments, such UPA provide a customized response for more than one user, e.g., the message provided on the display 104 may be specific to each user of a plurality of users, and the message to be displayed may be determined based on the user credential associated with the particular user.

In some embodiments, the appliance 10 may include a light 23, and the controller 210 may be configured to execute a UPA that includes activating the appliance 10 and/or turning on the light 23. For example, the light 23 may be positioned within the drum of the washer 10 or dryer 11 of FIG. 1. As another example, the microwave 10 of FIG. 4 may be an over the range microwave, e.g., positioned above a range appliance such as the oven appliance 10 of FIG. 3. In such embodiments, the over the range microwave 10 may include a light 23 in a bottom portion thereof positioned and configured to illuminate a cooking surface, e.g., such as the cooktop 30 in FIG. 3. Also, the light 23 may be positioned within the cooking chamber of the oven of FIG. 3 or the cooking chamber of the microwave of FIG. 4. In such embodiments, the UPA may include a certain brightness level of light 23. The structure of the light itself is of no particular importance in the present disclosure, is well understood by those of skill in the art, and is not described herein in further detail for the sake of clarity and brevity. In still another embodiment, light 23 may be provided as part of dispensing assembly on refrigerator 10 in FIG. 5.

In some embodiments, appliance 10 may include a fan. For example, appliance 10 may be a room air conditioner 10 as in FIG. 2 including a fan 140. In such embodiments, controller 210 may execute a UPA that includes increasing the speed of the fan 140 and/or adjusting the temperature. Such might also be determined based on the identity of the user.

In various embodiments, appliance 10 may be a cooking appliance such as the oven 10 of FIG. 3 or the microwave 10 of FIG. 4. In such embodiments, the controller 210 may execute a UPA to turn off a fan 20. For example, if oven 10 of FIG. 3 is operating in a convection mode, fan 20 may be turned off in anticipation of the user opening door 25.

As shown in FIG. 5 and described above, appliance 10 may be a refrigerator appliance 10 including a dispensing assembly for ice and/or water controlled by panel 100, which may be locked to prevent e.g., children or pets from dispensing ice or water onto the floor. In such embodiments, controller 210 may execute a UPA to unlock the dispensing assembly or panel 100 if a mobile device 300 of a known user is detected.

In some embodiments, appliance 10 may be a dishwashing appliance 10 as described above and shown in FIG. 6. In such embodiments, controller 210 may execute a UPA to temporarily turn off and unlock the dishwasher 10 based on the presence of mobile device 300. Such may be useful if the user is e.g., adding another dish to appliance 10.

The examples of UPAs and appliances 10 are representative only and other applications with various UPAs may be configured and fall within the scope of the present invention and claims the follow, as will be understood by one of ordinary skill in the art using the teachings disclosed herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of appliance operation, comprising:
   detecting a presence of a mobile device of a user;
   determining a position of the mobile device relative to a first appliance a first appliance using a position determining network;
   ascertaining whether the position of the mobile device relative to the first appliance meets a predetermined position parameter and, if so, then
      causing the first appliance to automatically execute at least one user-preferred-action based on the position of the mobile device of the user;
      wherein the position determining network comprises the first appliance, a second appliance, the mobile device, and a server; and
      wherein the first appliance and the second appliance each comprise a user interface panel.

2. The method of appliance operation as in claim 1, wherein the determining further comprises using triangulation between the first appliance, the second appliance, and the mobile device to determine the position of the mobile device.

3. The method of appliance operation as in claim 2, wherein the determining further comprises detecting a first distance between the first appliance and the mobile device.

4. The method of appliance operation as in claim 3, wherein the determining further comprises detecting a second distance between the second appliance and the mobile device.

5. The method of appliance operation as in claim 4, wherein the determining further comprises detecting a third distance between the first appliance and the second appliance.

6. The method of appliance operation as in claim 5, further comprising communicating one or more of the first distance, the second distance, and the third distance to a cloud-server.

7. The method of appliance operation as in claim 6, wherein the ascertaining is performed by the cloud-server.

8. The method of appliance operation as in claim 4, further comprising communicating the second distance from the second appliance to the first appliance.

9. The method of appliance operation as in claim 1, wherein the detecting further comprises receiving a wireless signal of the mobile device.

10. The method of appliance operation as in claim 1, wherein the first appliance comprises an oven, and the user-preferred-action comprises deactivating an oven fan.

11. The method of appliance operation as in claim 1, wherein the first appliance comprises a light, and the user-preferred-action comprises activating the light.

12. The method of appliance operation as in claim 1, wherein the first appliance comprises a display panel, and the user-preferred-action comprises causing a notification to be provided by the display panel.

13. The method of appliance operation as in claim 1, wherein the first appliance comprises a dispensing assembly configured to dispense at least one of: liquid water and ice, and the user-preferred-action comprises unlocking the dispensing assembly.

14. The method of appliance operation as in claim 1, wherein the user-preferred-action comprises automatically unlocking the appliance.

15. An appliance, comprising:
    a cabinet; and
    a controller located in the cabinet, the controller configured for
       detecting a presence of a mobile device of a user;
       determining a position of the mobile device relative to the appliance using a position determining network;
       ascertaining whether the position of the mobile device relative to the appliance meets a predetermined position parameter and, if so, then
       causing the appliance to automatically execute at least one user-preferred-action based on the position of the mobile device of the user,
       wherein the position determining network comprises the first appliance, a second appliance, the mobile device, and a server; and
       wherein the first appliance and the second appliance each comprise a user interface panel.

16. The appliance of claim 15, wherein the appliance comprises an oven, and the user-preferred-action comprises deactivating an oven fan.

17. The appliance of claim 15, wherein the appliance comprises a light, and the user-preferred-action comprises activating the light.

18. The appliance of claim 15, wherein the appliance comprises a display panel, and the user-preferred-action comprises causing a notification to be provided by the display panel.

19. An appliance, comprising:
    a cabinet; and
    a controller, the controller configured for
       detecting a presence of a mobile device of a user;
       determining a position of the mobile device relative to the appliance;
       ascertaining whether the position of the mobile device relative to the appliance meets a predetermined position parameter and, if so, then
       causing the appliance to automatically execute at least one user-preferred-action based on the position of the mobile device of the user;
       wherein the appliance comprises one of: a cooking appliance, a refrigerator appliance, and a dishwashing appliance;
       wherein when the appliance comprises a cooking appliance, the at least one user-preferred-action comprises turning off a fan in anticipation of the user opening a door of the cooking appliance;
       wherein when the appliance comprises a refrigerator appliance, the at least one user-preferred-action comprises unlocking a dispensing assembly for at least one of: ice and water; and
       wherein when the appliance comprises a dishwashing appliance, the at least one user-preferred-action comprises temporarily turning off and unlocking the dishwasher appliance.

20. The appliance of claim 19, wherein the controller is further configured to use triangulation between the first appliance, a second appliance, and the mobile device to determine the position of the mobile device, wherein the second appliance further comprises a cabinet.

\* \* \* \* \*